March 1, 1966 P. S. DE CARLI 3,238,019
METHOD OF MAKING DIAMOND
Filed Oct. 1, 1963 4 Sheets-Sheet 1
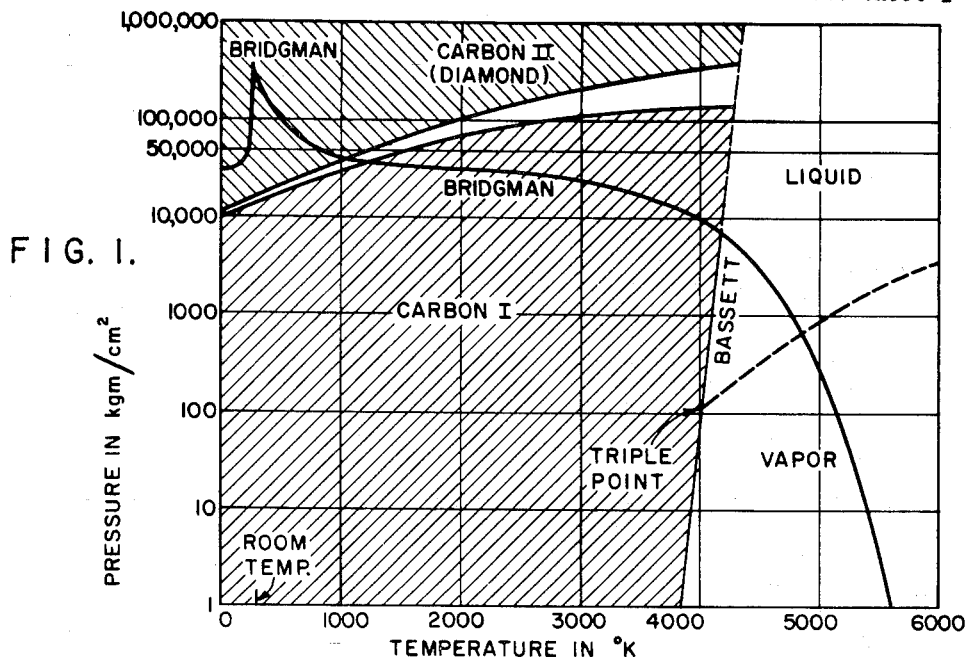
FIG. 1.
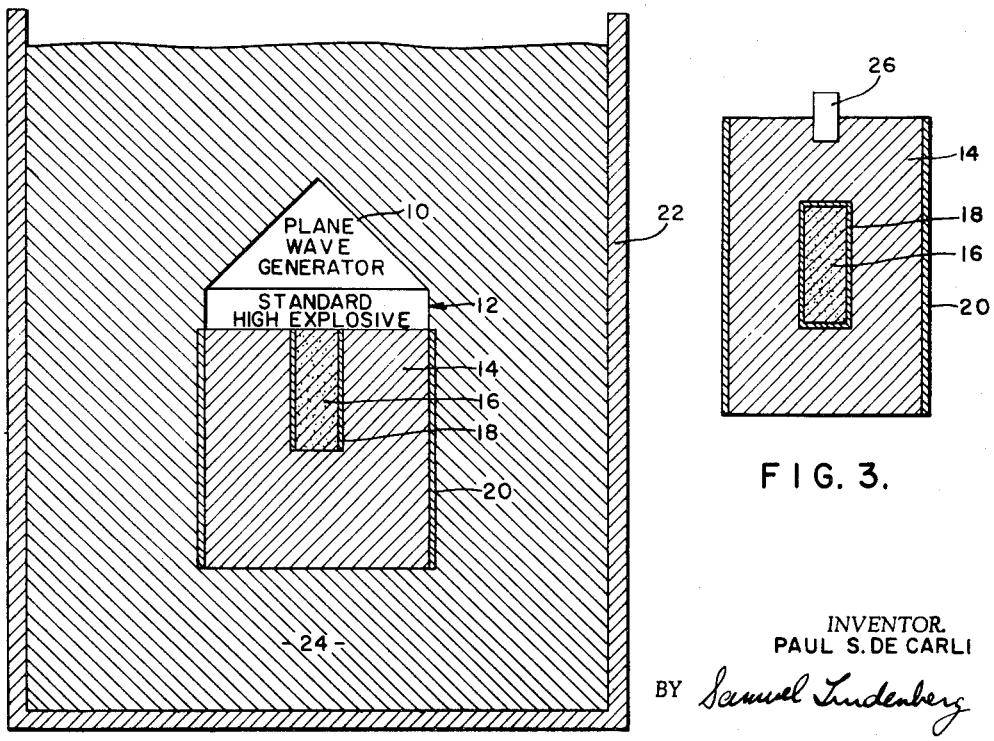
FIG. 2.
FIG. 3.
INVENTOR.
PAUL S. DE CARLI
BY Samuel Lindenberg
ATTORNEY March 1, 1966 P. S. DE CARLI 3,238,019
METHOD OF MAKING DIAMOND
Filed Oct. 1, 1963 4 Sheets-Sheet 2
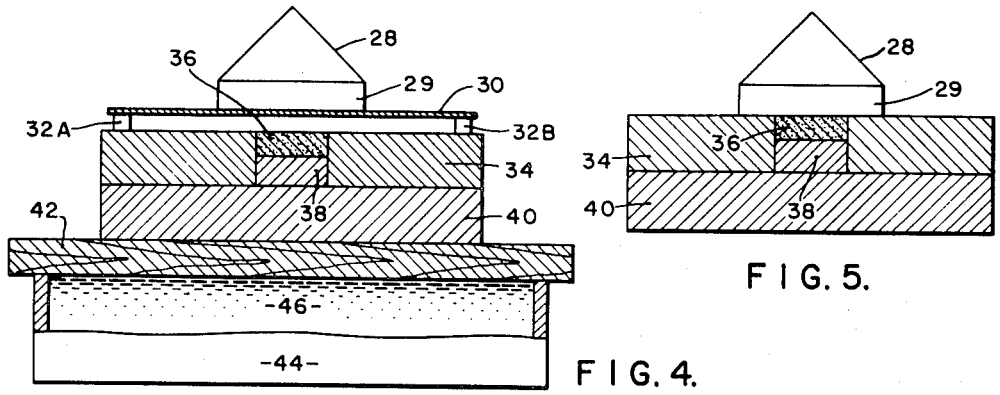
FIG. 4.
FIG. 5.
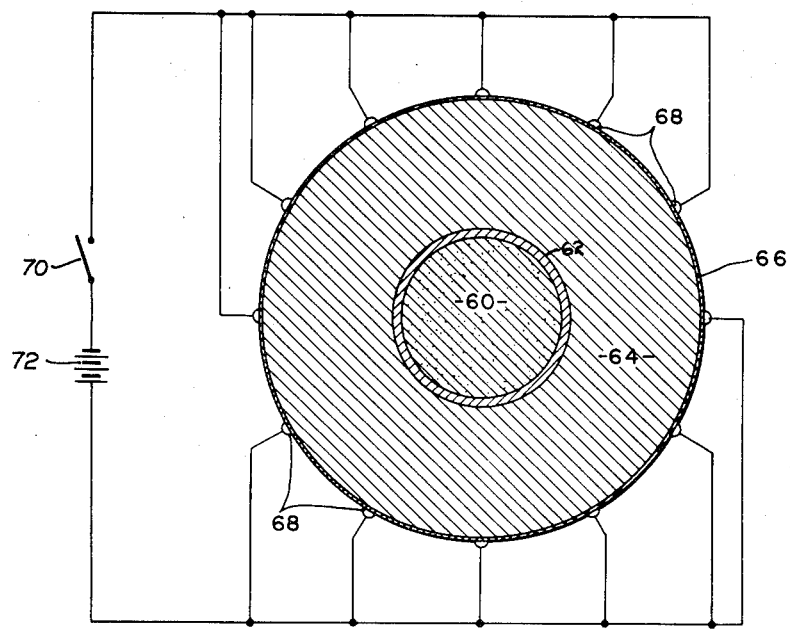
FIG. 7.
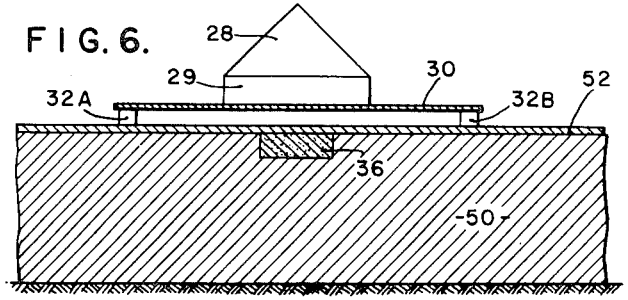
FIG. 6.
INVENTOR.
PAUL S. DE CARLI
BY *Samuel Lindenberg*
ATTORNEY March 1, 1966

P. S. DE CARLI 3,238,019

METHOD OF MAKING DIAMOND

Filed Oct. 1, 1963

INVENTOR.
PAUL S. DE CARLI
BY Samuel Lindenberg

ATTORNEY

March 1, 1966  P. S. DE CARLI  3,238,019
METHOD OF MAKING DIAMOND
Filed Oct. 1, 1963  4 Sheets-Sheet 4

INVENTOR.
PAUL S. DE CARLI
BY Samuel Lindenberg
ATTORNEY

United States Patent Office

3,238,019
Patented Mar. 1, 1966

3,238,019
METHOD OF MAKING DIAMOND
Paul S. De Carli, Menlo Park, Calif., assignor to Stanford Research Institute, Palo Alto, Calif., a corporation of California
Filed Oct. 1, 1963, Ser. No. 313,049
6 Claims. (Cl. 23—209.1)

This application is a continuation-in-part of application Serial No. 85,362, filed January 27, 1961, and now abandoned, for "Method and Means of Making Diamonds" by this inventor.

This invention relates to a method and means of making diamonds from carbonaceous material and more particularly to improvements therein.

Diamonds have been made by subjecting carbonaceous material to enormous static pressures. The apparatus required for exerting these pressures is quite expensive. This method of making diamonds is known as the static method.

An object of the invention is to provide a novel method and means for making diamonds from carbonaceous material.

Still another object of this invention is the provision of a method and means for making diamonds from carbonaceous material, which is simpler than previously known arrangements.

Another object of this invention is the provision of a method and means for making diamononds from carbonaceous material which is less expensive than heretofore used methods.

Yet another object of this invention is to provide a unique method and means of forming diamonds from carbonaceous material by using explosive techniques.

These and other objects of this invention are achieved by applying a shock wave or pressure pulse to carbonaceous material having a sufficient amplitude to cause a transition of the carbonaceous material or particles thereof to the stable diamond form. Examples of carbonaceous materials suitable for use in accordance with this invention include natural graphite, artificial graphites and graphitic carbons, petroleum coke, coal coke and lampblack. These are to be considered by way of example only and not as a limitation upon the invention.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a phase diagram of carbon; and

FIGURES 2 through 7 are cross-sections of different arrangements, in accordance with this invention, for applying shock waves to carbon to produce diamonds.

Figure 8:
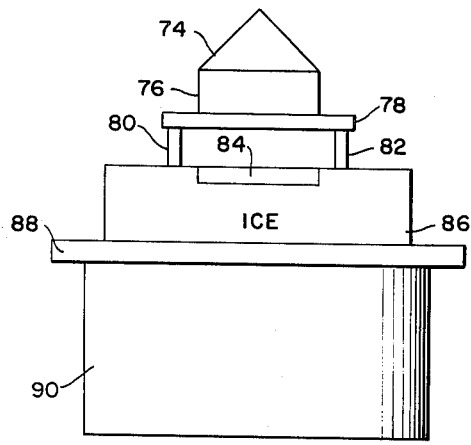
FIGURE 8 shows an arrangement in accordance with this invention for appling a shock wave to carbon using ice as a container.

Reference is now made to FIGURE 1 which is shown for the purpose of assisting in an understanding of this invention. FIGURE 1 shows the various phases of carbon which are plotted with pressure in kilograms per square centimeter as the ordinate and temperature in degrees Kelvin as the abscissa. This diagram is only approximately correct in its details. Further experimental discoveries may result in a slight shift of the boundary between Carbon I and Carbon II. It can be seen that there is a region in which lines slope up to the left which defines the stability field of Carbon II or diamond. As a result of the combination of the application of temperature and pressure, Carbon I can be transferred to the form known as Carbon II, or diamond. By means of this invention, a combination of the requisite pressure and temperature is applied to carbonaceous material to form diamonds therefrom. From the diagram, it may be seen that at room temperature diamond is the stable form of carbon at pressures above 13,000 kilograms per square centimeter. At 2,000° K., diamond is the stable form of carbon above 100,000 kilograms per square centimeter.

Reference is now made to FIGURE 2 which shows a cross-section of one form of apparatus which, in accordance with this invention, is suitable for applying shock waves to graphite for producing diamonds. This includes an arrangement wherein a plane-wave generator 10 is employed for generating a plane-pressure wave which is used to detonate a charge of standard high explosive 12. The plane-pressure wave generator is an arrangement well known in the art and is explained and described, for example, in an article by J. H. Cook, entitled "Engraving on Metal Plates by Means of Explosive," in the British Journal of Research, volume I, page 474, published in 1948.

The standard high explosive may be of the type, for example, known in the trade as composition B, which is a mixture of TNT and cyclotrimethylenetrinitramine (known in the industry as RDX). The standard high explosive is in contact with more high explosive 14, which surrounds a sample of graphite 16. Such additional high explosive can consist, for example, of the cyclotrimethylenetrinitramine in a plastic binder. The graphite is to be contained in order to facilitate recovery. An example of such containment is to plate the graphite sample with copper 18 to a thickness on the order of 0.020". The explosive 14 is contained in a cylindrical shell 20, which may be of glass or other convenient material. The entire arrangement may be contained in any suitable protective device, yet one which enables the carbon to be recovered. Such an arrangement may be, for example, a tank 22 filled with sand 24 and the embodiment of the invention is surrounded by sand. The residue after the shock treatment is purified by appropriate chemical or physical procedures which are known in the art to separate out the diamond particles.

FIGURE 3 illustrates in cross-section another arrangement of an explosive and sample, in accordance with this invention, for obtaining the requisite temperature and pressure. This arrangement does not require a plane-wave generator. Apparatus in FIGURE 3, which is the same as that shown in FIGURE 2, bears the same reference numerals.

A container 20 contains a standard high explosive material 14, which surrounds a metal container 18, which encloses the graphite block 16. The metal container may comprise a metallic plating on the graphite. A detonator 26, which is inserted through one end of the container 20 for detonating the high explosive 14, may comprise an electric or non-electric blasting cap of sufficient strength. The type known in the trade as a number 6 electric blasting cap is adequate. The entire arrangement shown in FIGURE 3 may be placed in a container of sand, as shown in FIGURE 2, or in any other suitable arrangement which affords recovery of the sample.

By way of example, but not by way of limitation, the inside dimension of the container 20 may be two inches in diameter and four inches long. The graphite inside the metal container may be 2" long, ⅜" in diameter and is located on the axis of the explosive charge and 1½" from the detontator.

Referring back to FIGURE 2, the plane-wave explosive is initiated, and the detonation generated as a result causes the standard high explosive to be detonated. This also detonates the additional explosive material 14, whereby the carbon block has applied to it a sufficient pressure to place it or portions thereof in that part of the phase diagram wherein carbon is stable in its diamond form. By way of illustration of an arrangement of the type shown in FIGURE 2 which was actually constructed, but not by way of limitation on the invention, a graphite block ⅜" diameter by 2" long was surrounded by a cylinder of the explosive material 14 which had a diameter of 2" and a height of 3". The standard high explosive 12 was a disc ½" thick and had a diameter on the order of 2". It will be seen that the carbon, or graphite block, has explosive applied on all sides whereby the requisite pressure and temperature for converting the carbon crystals to diamond crystals were achieved.

FIGURE 4 illustrates in cross-section yet another arrangement for achieving the requisite pressure wave and temperature combination. This includes a plane-wave explosive generator 28, which detonates a suitable, standard high explosive 29. The high explosive 29 rests upon a "flying plate" 30, made of a suitable material. This material may be metal, ceramic or plastic. A convenient flying plate is made of metal. The plate is supported by plastic standoffs 32A, 32B, which are supported upon a metal ring 34. In the aperature in the center of the ring there is placed the graphite material 36, which is supported upon a metal plug 38. The base which supports all the foregoing structure is a metal disc 40.

Upon the initiation of the plane-wave generator 28, the standard high explosive 29 is detonated, whereupon the flying plate 30 is driven past the plastic supports 32A and 32B, shearing the edges of the plate from the central portion. The impact of the flying plate applies pressure to the carbon 36. The entire structure, before detonation, is placed in a tank or other protective device, such as the one illustrated in FIGURE 2. Another suitable protective arrangement is also illustrated in FIGURE 4. The embodiment of the invention is supported by a board 42, which rests on a drum 44, which is filled with water 46. The force of the explosion breaks the board, and the parts of the apparatus are driven into the water from which they can be recovered.

By way of illustration, and not by way of limitation, the dimensions for an embodiment of the invention which produced satisfactory results included standard high explosive 29, which was 4" in diameter and 2" thick. The flying plate 30 was a plate of aluminum 1/16" thick. The ring 34 was of aluminum and had a 6" outer diameter; the diameter of the opening therein was 2", and the thickness of the ring was 2". The graphite was roughly 1" thick and filled the aperture. The disc was also of aluminum and was 6" in diameter by 2" thick. The ring and disc, which may also be considered as "back-up" blocks, should have a shock impedance which is not less than that of the sample to be shocked. Although aluminum is mentioned in the description of the invention, other metals, such as iron or copper, may also be employed. The shape of these back-up blocks should be such as to absorb the excess energy to facilitate recovery of the sample. The type of graphite employed can be either powder, pressed or in block form.

FIGURE 5 shows another arrangement for applying the requisite pressure and temperature to a block of carbon to convert at least a portion thereof to diamonds. Apparatus which has the same structure and function as that shown in the preceding figure will have the same reference numerals applied thereto. Thus, in FIGURE 5 the plane-wave generator 28 again detonates the standard high explosive 29. This time no flying plate 30 is required. The standard high explosive is directly in contact with the graphite specimen 36. Also employed are the ring 34, the disc 40, and the plug 38 for supporting the specimen 36. The metal of which these are formed may be one of the types indicated. In an embodiment of the invention which was built, those portions of the apparatus in FIGURE 5 which have the same reference numerals as shown in FIGURE 4 have the same dimensions. The location of the plug 38 and the graphite 36 may be interchanged within the ring 34, if desired, and substantially the same results will be obtained.

Still another arrangement is illustrated in FIGURE 6. Those structures in FIGURE 6 having the same function as structures in FIGURE 4 bear the same reference numerals. In FIGURE 6, the graphite sample 36 is placed in a cavity in a very large block 50 made of a strong metal, such as iron, and a plate 52 of the metal is fastened by welding or some other means to cover the cavity containing the sample. The block 50 may rest on the ground. The block of metal 50 must be sufficiently large to withstand the force of the explosion. After the explosion, the sample may be recovered by removal of the plate 52 by machining or some other means.

If desired, a spherical geometry may be employed for applying the requisite pressure and temperature by means of an explosive. This is shown in cross-section in FIGURE 7, wherein the graphite specimen 60 is at the center of a sphere. The specimen 60 is enclosed by a spherical metal case 62. The high explosive material 64 encloses the metal case 62 and also has a spherical shape. The explosive is contained in a spherical case 66 which holds a plurality of detonators 68, all of which may be connected to one or more sources to effectuate simultaneous detonation of the detonators. The detonators are shown being simultaneously detonated by being connected through a switch 70 to a battery 72, as an example.

FIGURE 8 is a drawing illustrating another container which may be employed, in accordance with this invention, for making diamonds from graphite. A plane-wave generator 74 detonates a standard high explosive 76. This serves to apply a pressure pulse to a flying plate 78. The edges of the flying plate shear, in the manner previously described, and the plate strikes the carbon thereby applying a shock wave to the carbon 84. The carbon 84 is contained in a suitable recess in a block of ice 86. The ice container 86 may be supported on a plank 88 which is over a container of water 90.

The flying plate 78 applies a shock wave to the carbon and also serves to drive the ice and the carbon into the container of water. With metal containers, it has been necessary to dig out the impacted material from the container after an explosion and then to separate particles of carbon and diamond from the container material. With the ice container, the particles of diamond and carbon are more easily separated, since the ice melts whereby the solid material in the water in the container 90 may be filtered off and thus easily retrieved. The water and ice may also serve a useful function in assisting in rapidly cooling the material after the explosion whereby there may be less diamond loss due to heat.

Figure 9:
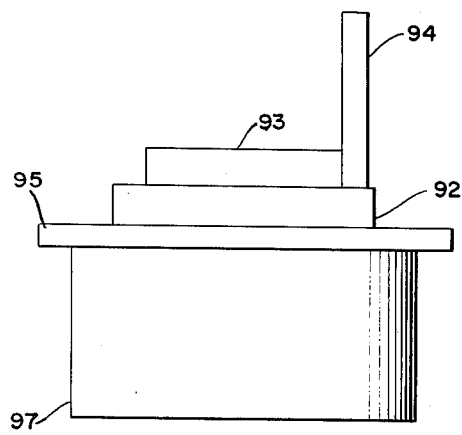

FIGURE 9 illustrates another arrangement, in accordance with this invention, for converting carbon into diamonds using a pressure pulse of the proper magnitude. Here no container is used for the carbon. The arrangement shown in FIGURE 9 causes a running detonation to be directly applied to a piece of standard high explosive 96 in contact with a block of carbon 92 which is not confined in any container. A sheet explosive leader 94, by way of example, is placed adjacent to a sheet of composition B explosive 93. This is placed on top of a block of carbon 92. The carbon block is placed on a board 95, for example, which rests over a container 97 of water. Upon detonation of the explosive, a pressure pulse is applied to the carbon and therethrough to the board 95, which is of sufficient intensity to break the board and plunge the carbon into the water. The solid particles are filtered from the water and the diamond particles are retrieved from the solid matter.

By way of illustration, and not by way of limitation, Table I shows some typical dimensions and approximate pressures and temperatures obtained in the carbon in using the arrangement shown in FIGURE 9. The temperatures are calculated average values based on current knowledge of the thermodynamic parameters of carbon. By average temperature, we mean the temperature average over a volume that is large compared to the scale of the inhomogeneities in density of the carbon. The pressure values are also average values.

Table I

| Carbon Density, g./cc. | Thickness, inches | Explosive | Pressure, kb. | | Temperature, ° C. | |
|---|---|---|---|---|---|---|
| | | | Top | Bottom | Top | Bottom |
| 1.68 | 3/8 | 1" Comp. B | 150 | 100 | 650 | 500 |
| 1.68 | 3/4 | 1" Comp. B | 150 | 80 | 650 | 400 |
| 1.68 | 3/4 | 2" Comp. B | 150 | 100 | 650 | 500 |

Figure 10:
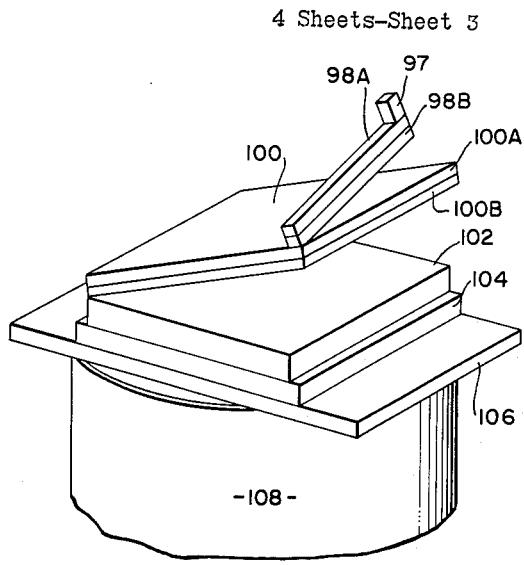
FIGURES 9, 10 and 11 show different arrangements for applying shock waves to carbon to produce diamonds in accordance with this invention, which do not require a container.

FIGURE 10 is a perspective drawing illustrating another method and apparatus for converting carbon to diamond without the use of a container. The arrangement of the explosive shown in FIGURE 10 is what is referred to in literature as a "mouse trap" plane-wave generator. A detonator 97 is placed at one end of a "line" of sheet explosive 98A, which is in contact with a "line" of metal 98B. The combination "line" 98A, 98B is placed adjacent one edge of a "sheet" combination and makes an angle therewith. The sheet combination comprises a sheet explosive 100A in contact with a metal sheet 100B. The sheet combination 100A, 100B is above and at an angle to composition B explosive 102. The composition B explosive 102 rests on a block of carbon 104. The block of carbon rests on a board 106, which rests on top of a container 108 which is filled with water. The explosive 98A is detonated by detonator 97 and together with the metal line 98B generates a line explosion which travels down the sheet of explosive 100A. The progression of the ignition through the sheet 100A is such that the sheet 100B is propelled against the composition B mat 102 in a manner such that the entire top surface of the composition B is detonated simultaneously to generate a plane-wave.

The plane-wave is applied to the carbon block 104 providing the required pressure and temperature to convert a substantial amount of the Carbon I to its Carbon II stable phase. The force of the explosion breaks up the carbon and plunges it into the container of water 108. Carbon particle recovery is made by filtering the solid matter from the water, or by evaporating the water away from the solid residue or by any other suitable arrangement for obtaining the desired separation.

Table II illustrates, by way of example and not by way of limitation, some typical dimensions, approximate pressures and temperatures which occurred in practicing the invention in accordance with FIGURE 10. As in the case of Table I, the temperatures are calculated average values and the pressures are measured average values.

Table II

| Carbon Density, g./cc. | Thickness, inches | Explosive | Measured Pressure, kb. | | Calculated Temperature, ° C. | |
|---|---|---|---|---|---|---|
| | | | Top | Bottom | Top | Bottom |
| 1.68 | 3/8 | 1" Comp. B | 240 | 150 | 1,000 | 650 |
| 1.68 | 3/4 | 1" Comp. B | 240 | 120 | 1,000 | 550 |
| 1.68 | 3/8 | 1" TNT | 160 | 100 | 700 | 500 |

Figure 11:
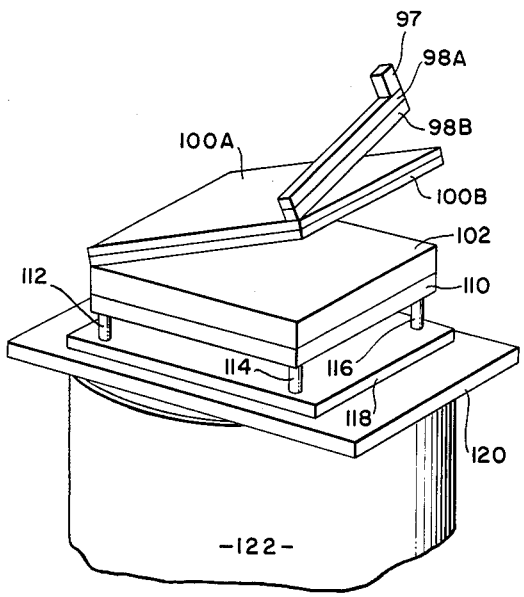

FIGURE 11 illustrates another arrangement for applying a plane-wave pressure pulse to a block of carbon for the purpose of making diamonds therefrom. Here again the mouse trap plane-wave generator consisting of the line-wave generator 98A, 98B, 100A, 100B, and the explosive pad 102 are employed for the purpose of establishing a plane-wave detonation. A flying plate 110 supports the composition B explosive 102. The flying plate, which may be made of a metal such as a 0.1" thick steel, is supported by four support members, only three, 112, 114, 116, of which are shown. A block of carbon 118 serves as the support for the support members. The carbon in turn may rest on a plank 120 which is positioned over a container of water 122, or may be suspended in any other suitable manner. Upon detonating the plane-wave generator, the flying plate applies a plane pressure wave to the carbon 118 which generates sufficient pressure and temperature so that the carbon is transported from its Carbon I state to its Carbon II or diamond state. The explosion drives the carbon into the container of water 122. Recovery is made by filtration or evaporation to retrieve the solid material from the water.

By way of example, and not by way of limitation, a 0.1" thick steel flying plate was supported by four 1" long standoffs over a block of carbon which was 3/8" thick. The carbon had an average density of 1.58 grams per cubic centimeter. A 2" thick composition B explosive pad was used. Top and bottom pressures averaged approximately 300 kilobars and 160 kilobars respectively, and calculated top and bottom average temperatures were 1300° C. and 700° C. respectively.

Figure 12:
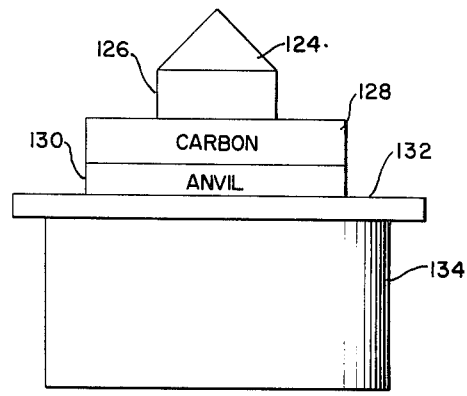
FIGURE 12 is an arrangement for applying a shock wave to carbon to produce diamonds, in accordance with this invention, which uses an anvil.

FIGURE 12 shows another arrangement in accordance with this invention, which may be employed for making diamonds from graphite. A plane-wave generator 124 detonates a standard high explosive pad 126. This is supported on a block of carbon 128. The carbon is positioned over an anvil or backing plate 130. The backing plate may rest on a plank 132 or may otherwise be supported over a container of water 134.

The operation of this arrangement is essentially the same as previously described from the standpoint that a pressure wave pulse is applied to the graphite when the explosive 126 is detonated which compresses the graphite sufficiently to raise its temperature and density to the diamond state. The anvil or plate of metal, such as steel, at the bottom of the carbon operates to reflect the shock wave back into the material. This means that a thicker sample of carbon may be processed using the same amount of explosive. While the shock wave peak diminishes in traveling through the material, the reflection from the anvil 130 builds it up again so that the material adjacent to the anvil will also receive a reflected shock wave which applies sufficient pressure and temperature to transport material near the anvil to the diamond state. An additional effect of the anvil is that it prolongs the pressure pulse over a substantial volume of the specimen.

By way of illustration, and not by way of limitation, of actual practice of the invention shown in FIGURE 12, a carbon block having a density of 1.68 g./cc., and, which was 1" thick and 10" square was placed on a steel anvil. A composition C-2 explosive was used which was approximately 1" deep and 9" square. A plane-wave generator of the type shown in FIGURE 10 was used.

The force of the shock wave obtained was about 250 kilobars at the top of the carbon block and was about 120 kilobars at the bottom, which increased to about 200 kilobars upon shock reflection from the anvil.

Figure 13:
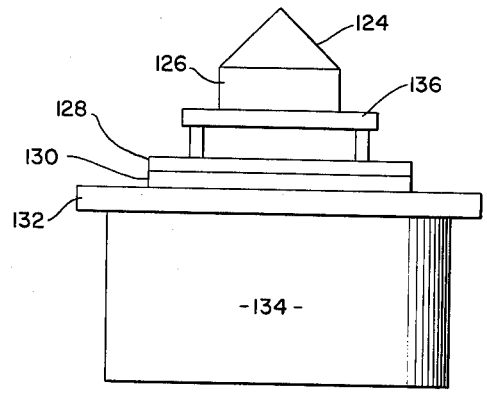
FIGURE 13 is an arrangement similar to FIGURE 12, except that it illustrates the use of a flying plate together with an anvil.

FIGURE 13 is substantially identical to FIGURE 12 except that it shows a flying plate 136 being used together with the anvil 130. The plane-wave generator 124 detonates the explosive pad 126 which drives the flying plate 136 against the carbon block 128. This is supported on an anvil 130 which in turn is supported by a board 132 over a water filled container 134, to facilitate diamond recovery. Aside from the shock wave pulse being applied by a flying plate, the phenomena that occur are as described for FIGURE 12.

Figure 14:
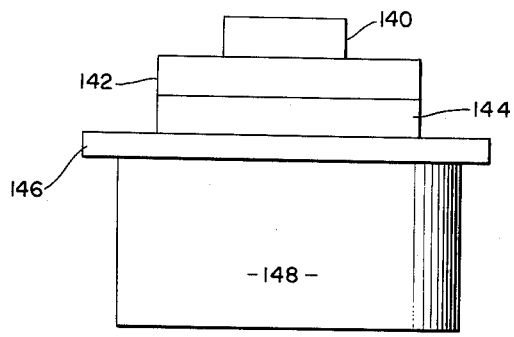
FIGURE 14 shows a simple arrangement in accordance with this invention for applying a shock wave to carbon to produce diamonds.

FIGURE 14 illustrates the simplest geometry which may be used for making diamonds from carbonaceous material in accordance with this invention. A detonator 140 is placed on one surface of a sheet explosive 142. The sheet explosive rests on a carbon block 144. The carbon block rests on a plank 146, which may be an anvil if desired. This may rest on a recovery container 148.

Figure 15:
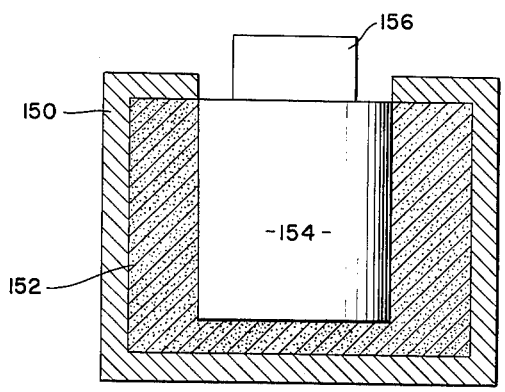
FIGURE 15 shows an arrangement for making diamonds from carbon wherein the carbon surrounds the high explosive.

FIGURE 15 illustrates, in cross-section, another geometry which may be used in accordance with this invention. A container 150 encloses carbon 152 in the center of which there is placed the required amount of high explosive 154. A detonator 156 is positioned through a suitable opening in the container 150 in contact with the high explosive 154. The high explosive, when detonated, applies a pressure pulse to the surrounding carbon, and if the pressure pulse is of the proper intensity, it can convert a portion of the carbon to diamond. As described previously, it may be concluded that the kind and amount of explosive required to be used for generating the requisite pressure and temperature in the carbonaceous material for causing its transition to the diamond state is a function of the density of the carbon. The higher the carbon density the greater the shock pressure required, the lower the carbon density the lower the shock pressure required. It is known that the heating which is caused by the pressure pulse or shock wave is greater for a low density material than for a high density material. Since it is also known that the transition is a function of both the pressure and temperature of the carbonaceous material, the above conclusion follows. By a low density carbon is meant a carbon having a density between 1 and 1.7 grams per cubic cm. By a high density carbon is meant carbon whose density is above 1.7. It is preferred to use carbonaceous materials having a range of densities between 1.0 to 2.0 g./cc., although this should not be construed as a limitation on the invention. By way of illustration, and not by way of limitation, usable pressures are in the range 100 to 700 kilobars. These are average pressures and may be determined for example in a manner described in a paper by D. G. Doran, "Measurements of Shock Pressures in Solids," ASME Reprint 62–WA–252 (1962).

The required shock temperatures result from the proper combination of density of carbon and the shock generating system. The temperature of the graphite having a density of 1.0 g./cc. becomes too high when shock pressure above several hundred kilobars is applied, and, therefore, a lower pressure can suffice to make diamonds here. In the case of graphite having densities between 1.5 and 1.7 g./cc. a wide range of pressures such as from 100 to 600 kilobars may be successfully used. In the case of graphite having a density on the order of 2.0 g./cc. or higher, pressures much greater than 600 kilobars may be required for the purpose. Thus, the requirements for a successful synthesis of diamond from graphite or other carbonaceous material appears to be first that the parameters of the shock, i.e., pressure, temperature, and duration of peak pressure, be in a range to permit diamond to form. The second requirement is that the conditions immediately after the shock be such as to permit at least a portion of the diamond formed by the shock to be recoverable. If the shock temperature is too high, i.e., the diamond formed by the shock will be converted to graphite after the shock has passed. Although diamond is not the thermodynamically stable form of carbon at one atmosphere pressure, the transition of diamond to graphite does not take place at measurable rates at temperature below 1000° C. At temperatures above 2000° C., the transition is quite rapid.

The yield of diamonds obtained, using the various apparatus and methods of this invention, does vary. Variations are not only due to the technique used, but also are due to type and density of carbonaceous material and type and amount of explosive. Thus, yields of up to 40-carats have been obtained using the geometry of FIGURE 11 and 5″ x 7″ x ⅜″ carbon blocks having a density of 1.58 g./cc. Using the geometry of FIGURE 11, carbon blocks 10″ x 10″ x ½″ and having a density of 1.68 g./cc., 9.3% of the recovered material was usable diamond. Using the geometry of FIGURE 10 and a carbon block 5″ x 7″ x ⅜″, having a density of 1.58 g./cc., approximately 36-carats of diamonds were recovered. Using the geometry of FIGURE 9 and a carbon block 5″ x 7″ x ⅜″ having a density of 1.58 g./cc. approximately 18-carats of usable diamonds were recovered.

From the foregoing description, it will be seen that it is possible to apply shock or pressure pulse waves to carbon or graphite which can change its stable state from that designated as Carbon I to the state designated as Carbon II, or diamond, in the phase diagram. The shock or pressure wave may be applied by placing the explosive adjacent the carbon surface, or by the use of a projectile, such as the flying plate, which is propagated against the carbon surface transmitting a pressure pulse through the material into said carbon. The shock wave should not cause the graphite to form a jet, since this has the effect of heating the material excessively. The durations of the shock or pressure waves applied to the carbon in the process of making diamonds were measured. They varied from approximately ½ to 10 microseconds. This should not be construed as a limitation on the term shock or pulse pressure wave, but is merely given as exemplary of the meaning of the term.

In the embodiments of the invention which have been built and used, the recovered particles have been positively identified as diamond by both X-ray diffraction and electron diffraction measurements. In accordance with the teachings of the present invention, carbonaceous material including carbon and graphite may be converted to diamond by the application thereto of a shock wave of sufficient intensity to meet a carbonaceous requirement of thermodynamic stability for diamonds. Although several arrangements for generating these shock waves using explosives and applying them to the specimen have been shown, those skilled in the explosives art will be able to employ other arrangements for this purpose. The figures given in the various examples for average temperatures and average pressures are determined using available technology which is not believed to produce an exact result, but rather an approximately exact result. However, those skilled in the explosive art know how much explosive is required to produce the indicated pressures. In any event, the dimensions and types of explosives which are given in the examples when used in the manner described and shown produce the requisite shock pressures and temperatures which in turn convert the carboniferous material to which these are applied to diamond. Therefore, it is to be understood that the arrangements shown are exemplary and are not to be construed as a limitation upon the invention.

I claim:
1. The method of forming diamond out of a body made of carbonaceous material having a predetermined average density and a flat surface comprising detonating a high explosive material for explosively generating a plane wave substantially coextensive with said flat surface to produce a shock pressure pulse, and applying said shock pressure pulse substantially simultaneously over said entire flat surface to cause a temperature and shock pressure within said body which transforms at least a portion of said carbonaceous material into diamond.

2. The method as recited in claim 1 wherein said average density of said carbonaceous material ranges between one and two grams per cubic centimeter and said shock pressure pulse average amplitude varies directly with the density over a range between 100 to 700 kilobars.

3. The method of forming diamond out of a body made of carbonaceous material having a predetermined average density and a surface area comprising placing the carbonaceous body on a support, detonating high explosive material for explosively generating a shock pressure pulse extending substantially simultaneously over said carbonaceous body surface area having an average amplitude which is a function of said average density to cause a temperature and shock pressure within said body sufficient for transferring at least a portion of said carbonaceous material to the region of thermodynamic stability for diamond and for driving the body through the support, applying said shock pressure pulse over said surface area of said body, catching the product resulting from the application of said shock pressure to said carbonaceous material in a container of liquid, and separating diamond from the product in said liquid.

4. The method of forming diamond out of a body made of carbonaceous material having a predetermined average density and a flat surface comprising placing a flat flying plate having a surface at least coextensive with the surface of said material adjacent to and facing said flat surface of the material, explosively generating a shock pressure wave at least coextensive with said flat surface of the material and directing said wave against the side of the plate remote from said material to propel said flying plate against said surface of said carbonaceous material to apply substantially simultaneously to said entire flat carbonaceous material surface a shock pressure pulse which causes a temperature and pressure within said body sufficient to transform at least a portion of said carbonaceous material into diamond.

5. The method of forming diamond out of a body made of carbonaceous material having a predetermined average density and a flat surface comprising placing the carbonaceous body on a support, placing a flat flying plate adjacent to and facing said flat surface, detonating a high explosive material adjacent said flying plate for explosively propelling said flying plate against said flat surface simultaneously to apply to said entire flat surface a shock pressure pulse having an amplitude which is a function of said average density and which is sufficient to cause a temperature and shock pressure within said body for transforming at least a portion of said carbonaceous material to diamond and for driving the body through the support, catching the product resulting from the application of said shock pressure to said carbonaceous material in a container of liquid, and separating diamond particles from the product in said liquid.

6. The method as recited in claim 5 wherein said average density of said carbonaceous material ranges between one and two grams per cubic centimeter and said shock pressure average amplitude varies directly with the density over a range between 100 to 700 kilobars.

References Cited by the Examiner

UNITED STATES PATENTS

| | | | |
|---|---|---|---|
| 3,022,544 | 2/1962 | Coursen et al. | 264—84 |
| 3,081,498 | 3/1963 | Davis et al. | 264—84 |

FOREIGN PATENTS 822,363    10/1959    Great Britain.

OTHER REFERENCES

Mellor: "Comprehensive Treatise On Inorganic and Theoretical Chemistry," vol. 5, 1924, pages 730–738.

Parsons: "Philosophical Transactions of the Royal Society," vol. 220 (1919), Series A, pages 72–75, 100, 101.

Wallace: "Product Engineering," vol. 32, Aug. 28, 1961, page 5.

OSCAR R. VERTIZ, *Primary Examiner.*

MAURICE A. BRINDISI, BENJAMIN HENKIN,
*Examiners.*

E. J. MEROS, *Assistant Examiner.*